US010508974B2

(12) United States Patent
Duncan et al.

(10) Patent No.: US 10,508,974 B2
(45) Date of Patent: Dec. 17, 2019

(54) STORING ANALYTICAL MACHINE DATA BASED ON CHANGE IN SCALAR MACHINE DATA INDICATING ALERT CONDITION

(71) Applicant: Computational Systems, Inc., Knoxville, TN (US)

(72) Inventors: Bradford J. Duncan, Knoxville, TN (US); Robert D. Skeirik, Knoxville, TN (US); Stewart V. Bowers, III, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 471 days.

(21) Appl. No.: 15/011,912

(22) Filed: Feb. 1, 2016

(65) Prior Publication Data

US 2017/0219461 A1 Aug. 3, 2017

(51) Int. Cl.
*G01M 99/00* (2011.01)
*G08B 21/18* (2006.01)
*G01H 1/00* (2006.01)

(52) U.S. Cl.
CPC ......... *G01M 99/008* (2013.01); *G08B 21/182* (2013.01); *G01H 1/00* (2013.01)

(58) Field of Classification Search
CPC .......... G01H 1/003; G01H 3/04; G01H 1/006; G01M 13/028; G01M 13/045; G08B 21/182; G08B 21/187; G05B 23/0275; G05B 19/4065; G06F 2201/81; G06F 11/0709; G06F 11/0751; G06F 11/0754
See application file for complete search history.

(56) References Cited

U.S. PATENT DOCUMENTS

| | | | |
|---|---|---|---|
| 5,895,857 A * | 4/1999 | Robinson ............... | G01H 1/003 73/602 |
| 7,027,953 B2 | 4/2006 | Klein | |
| 8,803,698 B1 | 8/2014 | Heydron | |
| 2008/0082296 A1* | 4/2008 | Robinson ................ | G01H 1/00 702/182 |
| 2014/0142871 A1* | 5/2014 | Lombriser .............. | G01H 1/00 702/56 |
| 2014/0324367 A1* | 10/2014 | Garvey, III ........... | G01D 18/00 702/56 |
| 2016/0048110 A1* | 2/2016 | Hilemon ................ | G08B 21/02 700/12 |

* cited by examiner

*Primary Examiner* — Judy Nguyen
*Assistant Examiner* — Leo T Hinze
(74) *Attorney, Agent, or Firm* — Luedeka Neely Group, P.C.

(57) ABSTRACT

A "store on alert" vibration data acquisition mechanism uses scalar data produced by a vibration monitoring device as a predicate to capturing and storing analytical vibration data in the vibration monitoring device. The scalar data may consist of scalar process variables generated in the vibration monitoring device that are acquired at a fixed interval, such as PeakVue and Overall Vibration. At each interval, these scalar data values are compared to machine performance threshold levels, such as ADVISE, MAINT and FAIL, to determine whether analytical vibration data is to be stored separately inside the vibration monitoring device. Since the analytical vibration data is captured based on a predicate inside the vibration monitoring device (i.e., comparison of the scalar value to the thresholds), the analytical vibration data includes more relevant diagnostic information about a specific machine performance event.

17 Claims, 4 Drawing Sheets

STORING ANALYTICAL MACHINE DATA BASED ON CHANGE IN SCALAR MACHINE DATA INDICATING ALERT CONDITION

FIELD

This invention relates to the field of machine vibration monitoring. More particularly, this invention relates to a system for storing analytical vibration data upon the occurrence of certain types of events related to machine operation.

BACKGROUND

Some machine vibration monitoring devices, such as the CSI 9420 wireless vibration monitor manufactured by Emerson Process Management, collect scalar vibration trend data on a scheduled (i.e., time basis) interval ranging from one minute to one hour (device publish rate). This scalar trend data is typically published to a wireless gateway, such as the Emerson 1420 gateway, at the specified schedule interval. In addition to scalar trend data, the CSI 9420 collects analytical vibration data relevant to vibration analysis.

As the term is used herein, "analytical vibration data" refers to all forms of vibration waveforms and spectra and by-products of the vibration waveform regardless of filtering, signal processing or measurement units. Examples include but are not limited to vibration acceleration waveforms and spectra, vibration velocity waveforms and spectra, displacement waveforms and spectra, PeakVue™ waveforms and spectra, demodulated waveforms and spectra, Spike Energy waveforms and spectra, Cepstrum, spectral density plots, and frequency transfer functions.

In conjunction with machine vibration analysis software, such as Emerson's AMS Machinery Manager (MHM) software, the CSI 9420 vibration monitor has provided users the ability to store analytical vibration data retrieved from the monitor on a scheduled basis interval. However, there have been some disadvantages with the scheduled interval technique. First, scheduled acquisitions simply obtain the analytical vibration data on a scheduled basis, not based on the severity of an alert condition that may be indicated by the data. Second, depending upon when the analytical vibration data was collected, it may not provide sufficient diagnostic information to correctly identify a machine fault. This is particularly problematic with non-repetitive events. Third, transferring large amounts of data across a wireless data network, such as a WirelessHART™ network, can be very costly due to bandwidth limitations of the communication protocol and the battery consumption of the network device. Fourthly, combining these factors, if multiple machines triggered an alert simultaneously, it may not be possible to retrieve the analytical vibration data from all of the devices prior to the next scheduled measurement cycle, when the pertinent data would be overwritten by the next data set.

What is needed, therefore, is a wireless data acquisition system that acquires, retains and transfers analytical machine vibration data when scalar data indicates a possible alert condition.

SUMMARY

The above and other needs are met by a "store on alert" vibration data acquisition mechanism that uses scalar data produced by a vibration monitoring device as a predicate to capturing and storing analytical vibration data in the vibration monitoring device. For example, the scalar data may consist of scalar process variables generated in the vibration monitoring device, such as PeakVue and Overall Vibration, which are acquired at a fixed interval. At each interval, these scalar data values are compared to machine performance threshold levels, such as ADVISE, MAINT, and FAIL, to determine whether analytical vibration data are to be stored separately inside the vibration monitoring device. Since the analytical vibration data are captured based on a predicate inside the vibration monitoring device (i.e., comparison of the scalar value to the thresholds), the data contain more relevant diagnostic information about a specific machine performance event.

In preferred embodiments, the analytical vibration data are stored as a comprehensive analytical vibration data set in separate buffers in the vibration monitoring device for consumption at a later date by a host system (such as AMS Machinery Manager software) for detailed machine analysis. In some embodiments, the host software can decide whether or not to pull the data from the vibration monitoring device based on analytics, user input, or system performance criterion.

In some embodiments, the host software decides whether to pull stored analytical vibration data from the machine monitoring device. Because the alerts and underlying scalar values are published from the machine monitoring device and pulled into the host software, the host software can analyze the scalar input data using the same or similar predicate algorithms used by the logic embedded in the device to make determinations similar to those made by the device's "store on alert" mechanism. In preferred embodiments, care is taken to ensure that the analytical vibration data transfer starts before the next data acquisition, because the buffered current analytical vibration data is overwritten by the device on each measurement (i.e., scheduled time-basis interval).

As the term is used herein, a "predetermined time interval" refers to any interval of time at which an action may occur. For example, a predetermined time interval may be the shortest time possible that hardware limitations will permit between the collection of data samples, such as on the order of microseconds for continuous data collection. A predetermined time interval may also be on the order of seconds, minutes or hours. Thus, in various embodiments of the invention, a predetermined time interval is not limited to any particular time value or range of values.

One preferred embodiment provides a method for collecting and storing analytical vibration data in memory of a machine vibration monitoring device. The method of this embodiment includes the following steps:

(a) storing one or more alert threshold levels in the memory of the machine vibration monitoring device, each alert threshold level comprising a scalar value indicating a threshold between two predefined machine operational condition ranges;

(b) measuring vibration levels of the machine using one or more sensors;

(c) based on the measured vibration levels, calculating a scalar vibration value using a processor in the machine vibration monitoring device;

(d) comparing the scalar vibration value to one or more of the alert threshold levels using the processor in the machine vibration monitoring device; and (e) if it is determined in step (d) that the scalar vibration value exceeds one or more of the alert threshold levels that the scalar vibration value did not exceed previously, storing analytical vibration data in the memory of the machine monitoring device for subsequent acquisition by a host computer.

In some embodiments, the method includes:
(f) the processor of the machine vibration monitoring device setting a status bit indicating that the analytical vibration data is available for acquisition; and
(g) the host computer determining that the analytical vibration data is available for acquisition based on presence of the status bit.

In some embodiments, the method includes:
(f) storing a minimum hysteresis counter value in the memory of the machine vibration monitoring device;
(g) updating an ongoing hysteresis counter value at predetermined time intervals;
(h) comparing the ongoing hysteresis counter value to the minimum hysteresis counter value at predetermined time intervals; and
step (e) further comprising storing the analytical vibration data in the memory of the machine monitoring device if it is determined that
the ongoing hysteresis counter value is greater than or equal to the minimum hysteresis counter value, and
the scalar vibration value exceeds one or more of the alert threshold levels that the scalar vibration value did not exceed at a prior predetermined time interval.

In some embodiments, the method includes:
(i) storing a baseline level scaling value (BLSV) in the memory of the machine vibration monitoring device;
(j) at predetermined time intervals, updating a low baseline level (LBL) according to:

$$LBL=AT-BLSV \times (AT-NLAT),$$

where AT is one of the alert threshold levels that is less than and nearest to the scalar vibration value, and NLAT is one of the alert threshold levels that is less than and nearest to AT; and
(k) at predetermined time intervals, updating a high baseline level (HBL) according to:

$$HBL=NHAT,$$

where NHAT is one of the alert threshold levels that is greater than and nearest to AT.

In some embodiments, the step of updating the ongoing hysteresis counter value (OHC) includes comparing the scalar vibration value to LBL and HBL, and
if the scalar vibration value is greater than HBL, incrementing OHC according to:

$$OHC=OHC+1;$$

if the scalar vibration value is less than LBL, decrementing OHC according to:

$$OHC=OHC-1;$$

if the scalar vibration value is greater than or equal to LBL and less than or equal to HBL, and OHC is greater than zero, decrementing OHC according to:

$$OHC=OHC-1; \text{ and}$$

if the scalar vibration value is greater than or equal to LBL and less than or equal to HBL, and OHC is less than zero, incrementing OHC according to:

$$OHC=OHC+1.$$

In some embodiments, the scalar vibration value is an Overall vibration value or a PeakVue vibration value.

In some embodiments, the subsequent acquisition of the analytical vibration data by the host computer is accomplished via a wireless gateway device through which the host computer wirelessly acquires the analytical vibration data that is published by the machine vibration monitoring device.

In some embodiments, the method includes maintaining the analytical vibration data in the memory of the machine vibration monitoring device until:
the host computer has acquired the analytical vibration data; or
the analytical vibration data is overwritten in the memory of the machine vibration monitoring device by later-collected analytical vibration data.

In another aspect, a preferred embodiment provides a method for collecting and storing analytical vibration data in memory of a machine vibration monitoring device. In this embodiment, the method includes the following steps:
(a) storing one or more alert threshold levels in memory of a host computer that is in communication with the machine vibration monitoring device, each alert threshold level comprising a scalar value indicating a threshold between two predefined machine operational condition ranges;
(b) measuring vibration levels of the machine using one or more sensors;
(c) storing analytical vibration data in the memory of the machine monitoring device;
(d) based on the measured vibration levels, calculating a scalar vibration value using a processor in the machine vibration monitoring device and storing the scalar vibration value in the memory of the machine monitoring device for subsequent acquisition by the host computer;
(e) the host computer acquiring the scalar vibration value from the memory of the machine vibration monitoring device and comparing the scalar vibration value to one or more of the alert threshold levels using a processor in the host computer; and
(f) if it is determined in step (e) that the scalar vibration value exceeds one or more of the alert threshold levels that the scalar vibration value did not exceed previously, the host computer acquiring the analytical vibration data from the memory of the machine vibration monitoring device and storing the analytical vibration data in the host computer or in a database that is in communication with the host computer.

In yet another aspect, a preferred embodiment provides an apparatus for collecting and storing analytical vibration data. The apparatus of this embodiment includes a vibration monitoring device and a host computer. The machine vibration monitoring device includes memory, one or more sensors, and a processor. The memory stores one or more alert threshold levels, where each alert threshold level comprises a scalar value indicating a threshold between two predefined machine operational condition ranges. The one or more sensors are for measuring vibration levels of the machine. The processor calculates scalar vibration values based on the measured vibration levels, compares the scalar vibration values to one or more of the alert threshold levels, and stores analytical vibration data in the memory of the machine monitoring device if a scalar vibration value exceeds one or more of the alert threshold levels that the scalar vibration value did not exceed previously. Subsequently, the host computer acquires the analytical vibration data that was stored in the memory of the machine vibration monitoring device.

In some embodiments, the apparatus includes a wireless gateway device through which the host computer wirelessly acquires the analytical vibration data that is published by the machine vibration monitoring device.

In some embodiments, the processor of the machine vibration monitoring device is operable to set a status bit indicating that the analytical vibration data is available for acquisition, and the host computer is operable to determine that the analytical vibration data is available for acquisition based on presence of the status bit.

In some embodiments, the memory of the machine vibration monitoring device stores a minimum hysteresis counter value, and the processor is operable to update an ongoing hysteresis counter value and compare the ongoing hysteresis counter value to the minimum hysteresis counter value at predetermined time intervals. The processor of the machine vibration monitoring device is further operable to store the analytical vibration data in the memory of the machine monitoring device if it is determined that the ongoing hysteresis counter value is greater than or equal to the minimum hysteresis counter value, and the scalar vibration value exceeds one or more of the alert threshold levels that the scalar vibration value did not exceed at a prior predetermined time interval.

In some embodiments, the memory of the machine vibration monitoring device also stores a baseline level scaling value (BLSV), and the processor is operable to update a low baseline level (LBL) at predetermined time intervals according to:

$$LBL=AT-BLSV\times(AT-NLAT),$$

where AT is one of the alert threshold levels that is less than and nearest to the scalar vibration value, and NLAT is one of the alert threshold levels that is less than and nearest to AT. The processor is further operable to update a high baseline level (HBL) at predetermined time intervals according to:

$$HBL=NHAT,$$

where NHAT is one of the alert threshold levels that is greater than and nearest to AT.

In some embodiments, the processor is operable to update the ongoing hysteresis counter value (OHC) by comparing the scalar vibration value to LBL and HBL, and if the scalar vibration value is greater than HBL, the processor is operable to increment OHC:

$$OHC=OHC+1;$$

if the scalar vibration value is less than LBL, the processor is operable to decrement OHC:

$$OHC=OHC-1;$$

if the scalar vibration value is greater than or equal to LBL and less than or equal to HBL, and OHC is greater than zero, the processor is operable to decrement OHC:

$$OHC=OHC-1;\text{ and}$$

if the scalar vibration value is greater than or equal to LBL and less than or equal to HBL, and OHC is less than zero, the processor is operable to increment OHC:

$$OHC=OHC+1.$$

In some embodiments of the apparatus, the scalar vibration value comprises one or more of an Overall vibration value, a PeakVue vibration value, or other scalar values as described in more detail hereinafter.

In some embodiments, the memory of the machine vibration monitoring device is operable to maintain the analytical vibration data in until:

the host computer retrieves the analytical vibration data; or the analytical vibration data is overwritten by later-collected analytical vibration data.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
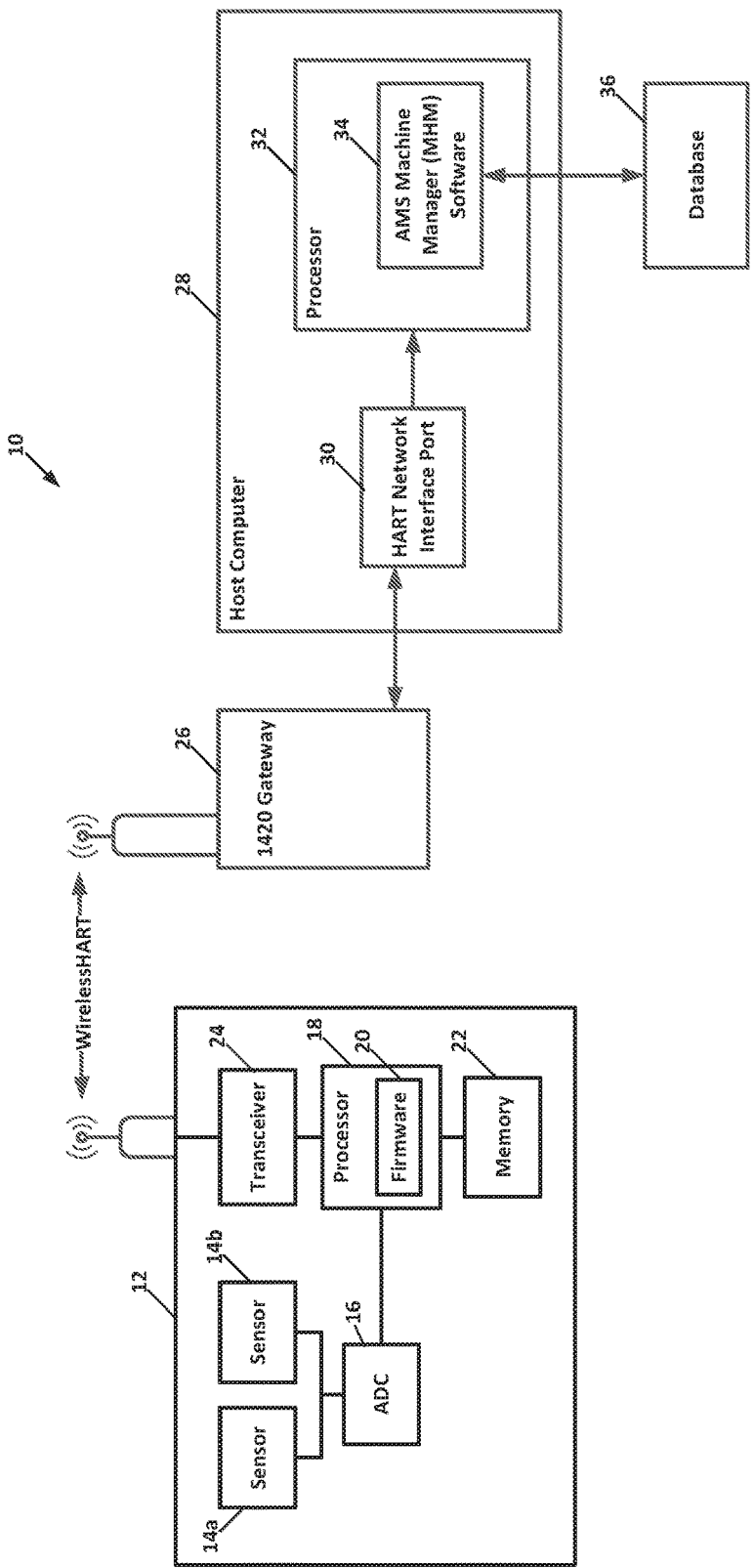
FIG. 1 depicts an apparatus for collecting and storing machine vibration data according to an embodiment of the invention.

As shown in FIG. 1, a preferred embodiment of an apparatus 10 for collecting and storing machine vibration data includes a wireless machine vibration monitoring device 12, a wireless network gateway device 26, a host computer 28 and a database 36.

An embodiment of the device 12 includes two sensors 14a and 14b, such as accelerometers, for sensing vibration of a machine and generating analog machine vibration signals based thereon. Other numbers of sensors could be used in various other embodiments. The device 12 includes an analog-to-digital converter (ADC) 16 for converting the analog machine vibration signals to digital vibration signals. A processor 18 of the device 12, under the control of firmware 20, acquires and stores the digital machine vibration data in onboard memory 22, as described in more detail hereinafter. The device 12 includes a transceiver 24 for transmitting the digital machine vibration data via a wireless network. In a preferred embodiment, the transceiver 24 operates using an industry-standard wireless communication protocol, such as WirelessHART, which is a wireless sensor networking technology based on the Highway Addressable Remote Transducer (HART) protocol.

In a preferred embodiment, the wireless network gateway device 26 is an Emerson 1420 Smart Wireless Gateway manufactured by Emerson Process Management, which also operates using the WirelessHART communication protocol. The gateway device 26 may include other wired and wireless interfaces for communicating with other devices on the network, such as Wi-Fi, Modbus, OPC, Ethernet IP, and Hart IP.

The host computer 28 includes a HART network interface port 30 for communicating with the gateway device 26. The host computer also includes a processor 32 that executes AMS Machine Manager (MHM) software 34 for managing and analyzing machine vibration data acquired from the device 12 via the WirelessHART network, as described in more detail hereinafter. Although FIG. 1 depicts a single host computer 28, and several functions are described herein as being performed by the host computer 28, it will be appreciated that those functions could be performed by more than one computer. Thus, the invention is not limited to any particular number of computers or devices that comprise the host computer 28.

Figure 2:
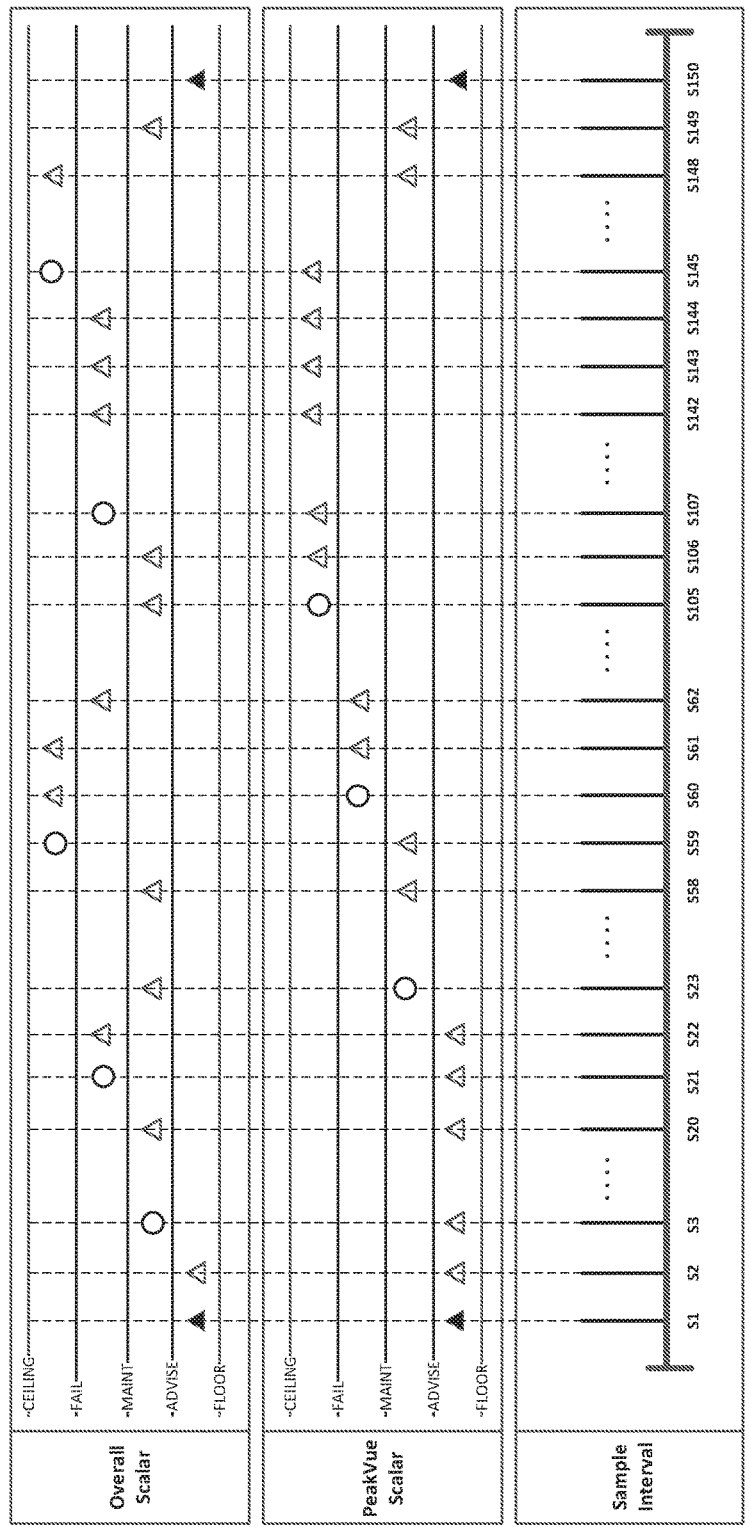
FIG. 2 depicts an exemplary machine vibration data collection timeline according to an embodiment of the invention.

FIG. 2 shows an example of a data collection strategy implemented by a preferred embodiment. In the uppermost portion of FIG. 2, measured Overall Vibration scalar values are plotted at certain data sampling intervals (S1, S2, etc.). As will be appreciated by one of ordinary skill in the art, an Overall Vibration level is a measure of the total amount of vibration energy in a low-pass, band-pass or high-pass filtered vibration waveform over a wide range of frequencies (typically represented in in/s). Each Overall Vibration value falls into one of three alert zones that are defined by the user, thresholds for which are stored in the device and/or host software. In a preferred embodiment, the alert zones are:

the NOMINAL zone, in which levels are greater than or equal to the FLOOR and less than the ADVISE threshold;

the ADVISE zone, in which levels are greater than or equal to the ADVISE threshold and less than the MAINT threshold;

the MAINT zone, in which levels are greater than or equal to the MAINT threshold and less than the FAIL threshold; and the FAIL zone, in which levels are greater than or equal to the FAIL threshold.

The threshold levels that define these alert zones (also referred to herein as alert levels) are preferably stored in non-volatile memory 22 of the device 12 and are configurable via the wireless device interface. A machine operating in the NOMINAL zone is operating normally, and no attention is required. Operation in the ADVISE zone indicates that vibration levels are somewhat higher than normal, which may be an indication of a trend toward a failure condition. Operation in the MAINT zone indicates that near term maintenance of the machine should be scheduled. Operation in the FAIL zone indicates that the machine should be taken off-line for maintenance as soon as possible taking into consideration factors such as the criticality of the machine and impact of the failure.

The same alert zones for measured PeakVue scalar values are depicted in the central portion of FIG. 2. As will be appreciated by one of ordinary skill in the art, a PeakVue value is a scalar value representing the peak value of a high-pass filtered and full-wave-rectified acceleration waveform over a certain sampling interval (typically represented in g's), as described in U.S. Pat. No. 5,895,857 to Robinson et al. (incorporated herein by reference).

The black triangles in FIG. 2 represent analytical vibration data acquisitions that in prior systems were made on a scheduled basis. The white circles represent analytical vibration data acquisitions that are made on a "store on alert" basis as described in more detail hereinafter. The white triangles represent data sampling intervals at which no analytical vibration data is collected.

Generally, a point of interest for a vibration data analyst would be when the scalar data (Overall Vibration or Peak-Vue or other) crosses from a less-severe alert zone to a more severe alert zone. In such a situation, the "store on alert" mechanism evaluates the transition of the scalar data values between alert zones defined in the firmware of the machine monitoring device to store the analytical vibration data when these alert zones are crossed. In a preferred embodiment, when a scalar data value crosses from one alert zone to a higher alert zone, the corresponding underlying analytical vibration data set is latched internally in the device 12 (white circle) and the host system software 34 is notified via a status bit of the presence of an analytical vibration data set stored in the device memory 22. Thus, the analytical vibration data are automatically stored in the device memory 22 when the scalar data value crosses to a higher alert level. Additionally, if the scalar data value falls below the existing alert level and rises back above the same level again during a later acquisition, it is internally re-latched in the memory 22 of the device 12. For simplicity, hysteresis analysis is not shown in FIG. 2 but is described in detail in FIGS. 3A and 3B.

Figure 3A:
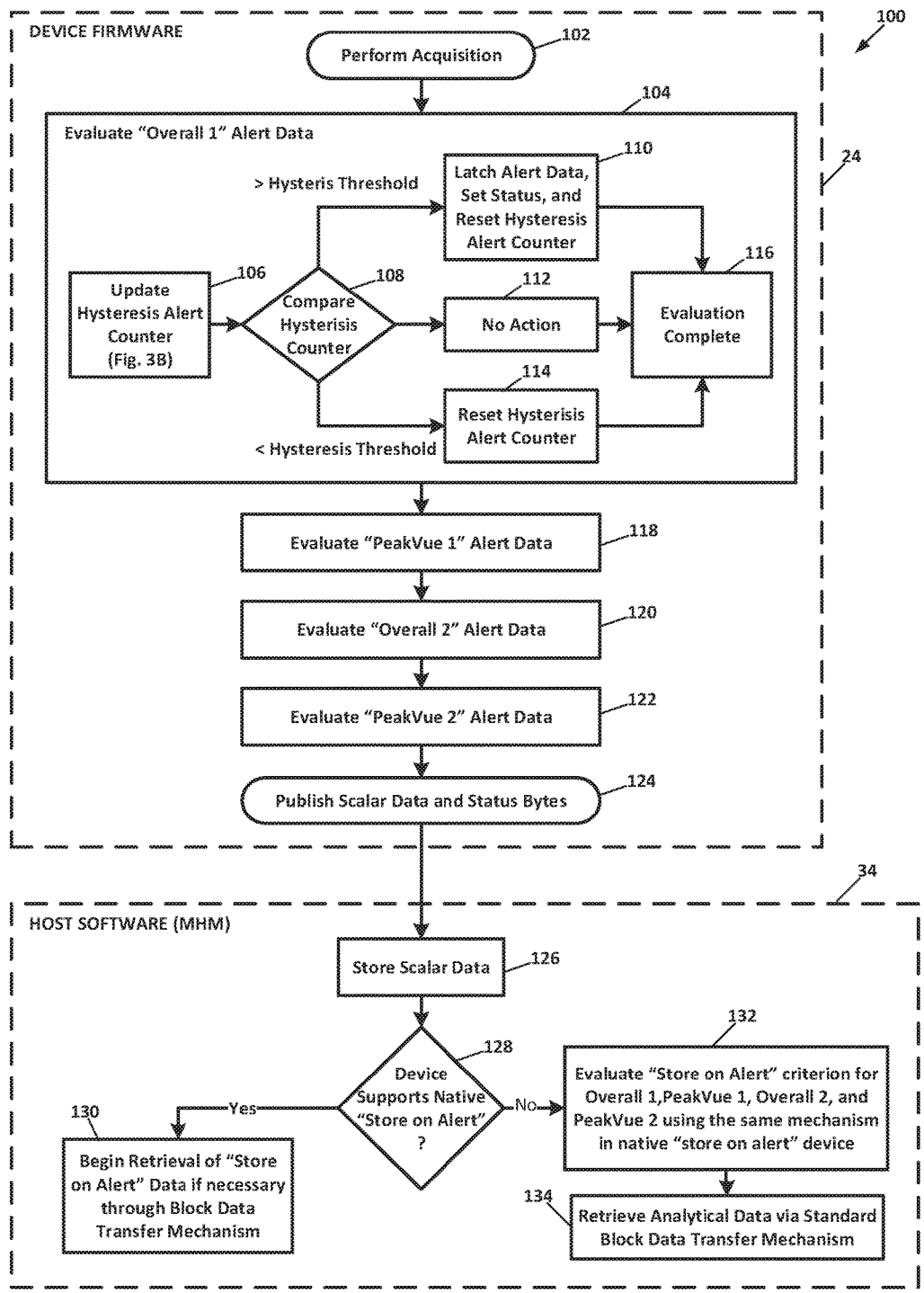
FIGS. 3A and 3B depict a process for collecting and storing machine vibration data according to an embodiment of the invention.
Figure 3B:
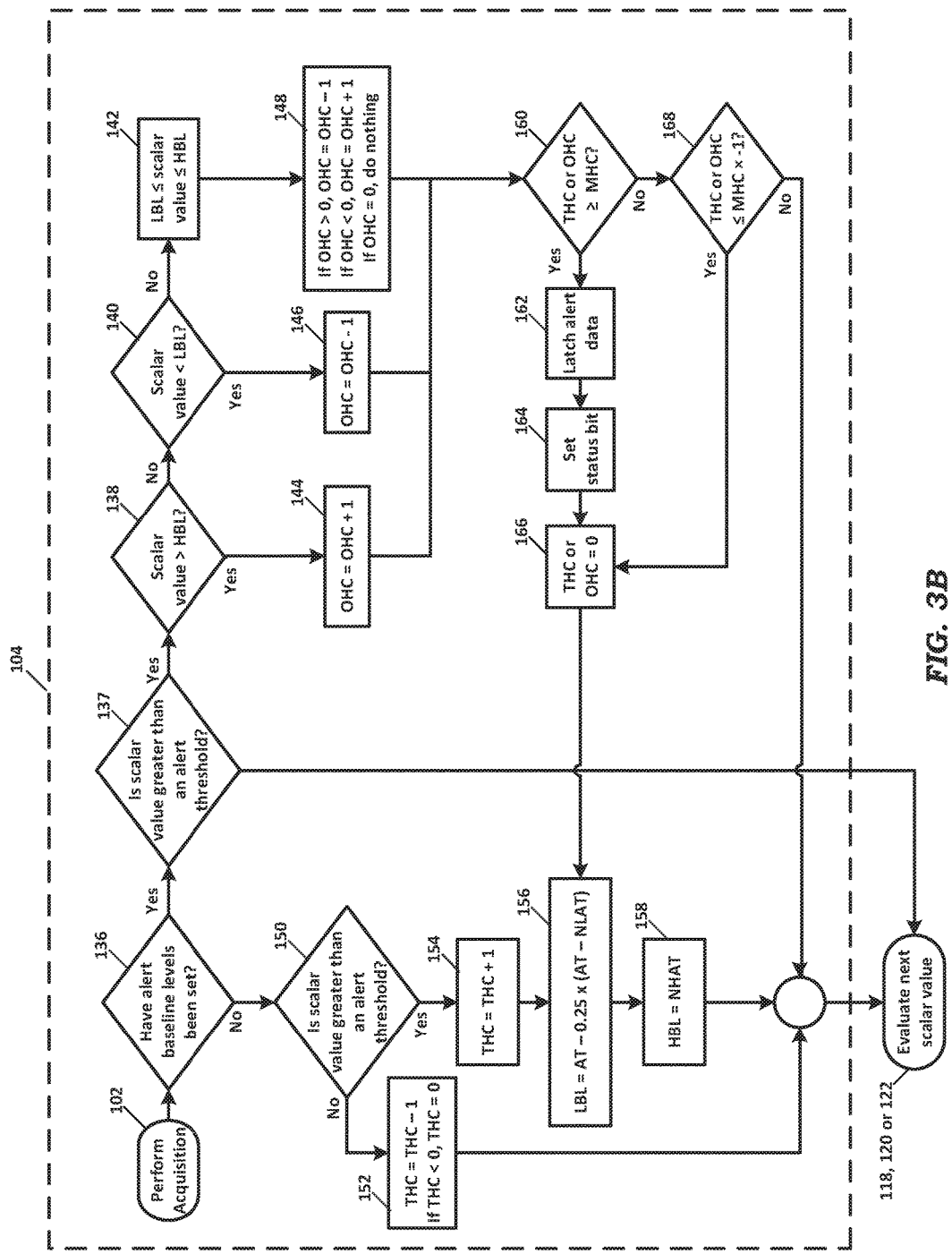

FIGS. 3A and 3B depict a preferred embodiment of a process 100 for making the data latch determination in the firmware 20 of the machine monitoring device 12 and for retrieving the analytical vibration data from the machine monitoring device 12 by the host computer 28.

Device Firmware Operations

When a data acquisition is scheduled to be performed by the device 12 (at a rate defined by the "publish rate" of the device), the device 12 starts collecting vibration data (step 102). At the end of the vibration data collection interval, the device 12 will have an Overall Vibration value and a PeakVue value for each of the two data collection channels. In a preferred embodiment, the device processor 18 also computes FFTs on the Overall Vibration and PeakVue waveforms to derive their spectra and compute energy bands. As a result of the data acquisition (step 102), the data available to the device 12 includes:

Overall Vibration scalar value for sensor 14a (Channel 1);
PeakVue scalar value for sensor 14a (Channel 1);
Overall Vibration scalar value for sensor 14b (Channel 2); and
PeakVue scalar value for sensor 14b (Channel 2).

In a preferred embodiment, the device 12 also stores the analytical vibration data sets (acceleration waveform, Overall Vibration waveform, Overall Vibration spectrum, Peak-Vue waveform, and PeakVue spectrum) internally in device memory 22.

After the acquisition is performed, the processor 18 of the device 12 evaluates the measured Overall Vibration scalar value for channel 1 according to the process depicted in FIG. 3B. If alert baseline levels have not yet been set for the measured Overall Vibration scalar value (step 136), the scalar value is evaluated against the corresponding alert threshold level associated with the ADVISE, MAINT, or FAIL zones (step 150). If the scalar value is greater than any if the threshold levels, a trigger hysteresis counter (THC) is incremented (step 154). Otherwise, the trigger hysteresis counter is decremented, but with a minimum value of zero (step 152). Listing 1 below shows a pseudo-code implementation of this mechanism.

Listing 1: Pseudo-Code Implementation of Threshold Comparison Logic

```
IF(SCALAR_VALUE >= TRIGGER_ALERT_LEVEL)
    TRIGGER_HYS_COUNTER += 1
ELSE IF(SCALAR_VALUE <= TRIGGER_ALERT_LEVEL)
    TRIGGER_HYS_COUNTER -= 1
ELSE IF(TRIGGER_HYS_COUNTER < 0)
    TRIGGER_HYS_COUNTER = 0
```

When a scalar value exceeds an alert zone threshold and no baseline levels have yet been set, a low baseline level (LBL) is created by setting a percentage below the threshold of the alert zone in which the scalar value falls. In a preferred embodiment, this percentage (which is initially set to 25%) is a configurable baseline level scaling value that is stored in the non-volatile memory 22. In a preferred embodiment, LBL is calculated as:

$$LBL = AT - 0.25 \times (AT - NLAT),$$

where AT is the lower alert threshold of the alert zone in which the scalar value falls, and NLAT is the next lower alert threshold (step 156). A high baseline level (HBL) is set to the alert threshold of the next higher alert zone (NHAT) (step 158). Table 1 shows an example of this calculation.

TABLE 1

Setting of Alert Level Baselines

| Alert Zone | Level | Low Baseline | High Baseline |
| --- | --- | --- | --- |
| ADVISE | 1.00 | 0.75<br>Baseline = ADVISE − (0.25 × ADVISE)<br>Baseline = 1 − (0.25 × 1) = 1 − 0.25 = 0.75 | 2<br>(MAINT Level) |
| MAINT | 2.00 | 1.75<br>Baseline = MAINT − (0.25 × (MAINT − ADVISE))<br>Baseline = 2 − (0.25 × (2 − 1)) = 2 − 0.25 = 1.75 | 3<br>(FAIL Level) |
| FAIL | 3.00 | 2.75<br>Baseline = FAIL − (0.25 × (FAIL − MAINT))<br>Baseline = 3 − (0.25 × (3 − 2)) = 3 − 0.25 = 2.75 | Upper Limit<br>(CEILING) |

If baseline levels have been set (step 136) and a scalar value exceeds an alert zone threshold (step 137), an ongoing hysteresis counter (OHC) is maintained based on the scalar value crossing the low baseline level or the high baseline level. If the scalar value crosses the high baseline threshold (step 138), the ongoing hysteresis counter is incremented (step 144). If the scalar value is less than the low baseline threshold (step 140), OHC is decremented (step 146). If the scalar value is between the high and low baselines (step 142), the ongoing hysteresis counter is either decremented or incremented to move it toward zero, unless the ongoing hysteresis counter is already at zero, at which point it remains at zero (step 148). Listing 2 shows a pseudo-code implementation of this mechanism.

Listing 2: Pseudo-Code Implementation of Threshold Comparison Logic

```
IF(SCALAR_VALUE >= HIGH_BASELINE)
  ONGOING_HYS_COUNTER += 1
ELSE IF(SCALAR_VALUE <= LOW_BASELINE)
  ONGOING_HYS_COUNTER -= 1
ELSE IF(HYS_COUNTER < 0)
  ONGOING_HYS_COUNTER +=1
ELSE IF(HYS_COUNTER > 0)
  ONGOING_HYS_COUNTER -= 1
```

As shown in FIG. 3A, the hysteresis counter (either the triggered hysteresis counter (THC) or the ongoing hysteresis counter (OHC)) is evaluated against a minimum hysteresis counter value (MHC) to determine the next course of action (step 108). The minimum hysteresis counter value is preferably stored in non-volatile memory 22 and is wirelessly configurable. If the hysteresis counter is greater than or equal to the minimum hysteresis counter value (step 108):

analytical vibration data are latched into a separate buffer in the memory 22 associated with Overall Vibration Channel 1;
  the alert level is re-baselined against the new alert level and the hysteresis counter is reset to zero; and
  a status bit for the highest exceeded alert level is set to notify the host system that new analytical vibration data are present in the memory 22 (step 110).

(This process is depicted in FIG. 3B as steps 160, 162, 164 and 166.)

If the hysteresis counter is less than or equal to the minimum hysteresis counter value multiplied by −1 (step 108), the alert level is re-baselined against the new alert level and the hysteresis counter is reset to 0 (step 114). (This process is depicted in FIG. 3B in steps 168 and 166.)

If the hysteresis counter is not greater than or equal to the minimum hysteresis counter value, and is not less than or equal to the minimum hysteresis counter value multiplied by −1 (step 108), no action is taken (step 112).

When the hysteresis count evaluation is complete for Overall Vibration Channel 1 (step 116), the process is repeated to evaluate PeakVue for Channel 1 (step 118), Overall Vibration for Channel 2 (step 120), and PeakVue for Channel 2 (step 122). After all the scalar values have been evaluated, the scalar data and status bytes are published to the WirelessHart 1420 gateway device 26 using the burst data publish mechanism, where the data are cached and retrieved by the MHM software 34 of the host computer 28 (step 124).

Host Computer Operations

In a preferred embodiment, the host computer 28 synchronizes the monitoring and database storage operations with the data publish rate of the device 12. Therefore, when a new measurement is published (step 124), the host processor 32 processes the alert data and determines further actions to initiate based upon user configuration.

Preferably, the host software 34 first stores the scalar data and device status to the database 36 (step 126). As determined by the host system software configuration and status bytes set in the device 12, the host software 34 either retrieves the analytical vibration data that have already been stored in the device 12 (step 130), or the host software 34 emulates the same "store on alert" algorithms described above to store analytical alert data (steps 132 and 134).

In the preferred embodiment, the retrieval of analytical vibration data from the device 12 is managed by the HART block data transfer protocol, which allows the host software 34 to pull bulk analytical vibration data from the device 12. The analytical vibration data can be selected from numerous buffers exposed by the block data transfer protocol. In a preferred embodiment, these buffers include the buffers defined in Table 2 below.

TABLE 2

Block Data Available from the Device

| BLOCK DATA COMMAND CODES | DEVICE VARIABLE CODE | DATA RETURNED |
| --- | --- | --- |
| (0x06)<br>BDCMD_READ_ALERT_OVERALL1_SPECTRUM | (0x02)<br>VC_OVERALL_1 | Sensor 1 Velocity Alert<br>(Overall 1) Spectrum |
| (0x06)<br>BDCMD_READ_ALERT_OVERALL1_SPECTRUM | (0x03)<br>VC_PEAKVUE_1 | Sensor 1 PeakVue Alert<br>(Overall 1) Spectrum |

TABLE 2-continued

Block Data Available from the Device

| BLOCK DATA COMMAND CODES | DEVICE VARIABLE CODE | DATA RETURNED |
|---|---|---|
| (0x06) BDCMD_READ_ALERT_OVERALL_1_SPECTRUM | (0x05) VC_OVERALL_2 | Sensor 2 Velocity Alert (Overall 1) Spectrum |
| (0x06) BDCMD_READ_ALERT_OVERALL_1_SPECTRUM | (0x06) VC_PEAKVUE_2 | Sensor 2 PeakVue Alert (Overall 1) Spectrum |
| (0x07) BDCMD_READ_ALERT_OVERALL1_WAVEFORM | (0x02) VC_OVERALL_1 | Sensor 1 Acceleration Alert (Overall 1) Waveform |
| (0x07) BDCMD_READ_ALERT_OVERALL1_WAVEFORM | (0x03) VC_PEAKVUE_1 | Sensor 1 PeakVue Alert (Overall 1) Waveform |
| (0x07) BDCMD_READ_ALERT_OVERALL1_WAVEFORM | (0x05) VC_OVERALL_2 | Sensor 2 Acceleration Alert (Overall 1) Waveform |
| (0x07) BDCMD_READ_ALERT_OVERALL1_WAVEFORM | (0x06) VC_PEAKVUE_2 | Sensor 2 PeakVue Alert (Overall 1) Waveform |
| (0x08) BDCMD_READ_ALERT_PEAKVUE1_SPECTRUM | (0x02) VC_OVERALL_1 | Sensor 1 Velocity Alert (PeakVue 1) Spectrum |
| (0x08) BDCMD_READ_ALERT_PEAKVUE1_SPECTRUM | (0x03) VC_PEAKVUE_1 | Sensor 1 PeakVue Alert (PeakVue 1) Spectrum |
| (0x08) BDCMD_READ_ALERT_PEAKVUE1_SPECTRUM | (0x05) VC_OVERALL_2 | Sensor 2 Velocity Alert (PeakVue 1) Spectrum |
| (0x08) BDCMD_READ_ALERT_PEAKVUE1_SPECTRUM | (0x06) VC_PEAKVUE_2 | Sensor 2 PeakVue Alert (PeakVue 1) Spectrum |
| (0x09) BDCMD_READ_ALERT_PEAKVUE1_WAVEFORM | (0x02) VC_OVERALL_1 | Sensor 1 Acceleration Alert (PeakVue 1) Waveform |
| (0x09) BDCMD_READ_ALERT_PEAKVUE1_WAVEFORM | (0x03) VC_PEAKVUE_1 | Sensor 1 PeakVue Alert (PeakVue 1) Waveform |
| (0x09) BDCMD_READ_ALERT_PEAKVUE1_WAVEFORM | (0x05) VC_OVERALL_2 | Sensor 2 Acceleration Alert (PeakVue 1) Waveform |
| (0x09) BDCMD_READ_ALERT_PEAKVUE1_WAVEFORM | (0x06) VC_PEAKVUE_2 | Sensor 2 PeakVue Alert (PeakVue 1) Waveform |
| (0x0A) BDCMD_READ_ALERT_OVERALL2_SPECTRUM | (0x02) VC_OVERALL_1 | Sensor 1 Velocity Alert (Overall 2) Spectrum |
| (0x0A) BDCMD_READ_ALERT_OVERALL2_SPECTRUM | (0x03) VC_PEAKVUE_1 | Sensor 1 PeakVue Alert (Overall 2) Spectrum |
| (0x0A) BDCMD_READ_ALERT_OVERALL2_SPECTRUM | (0x05) VC_OVERALL_2 | Sensor 2 Velocity Alert (Overall 2) Spectrum |
| (0x0A) BDCMD_READ_ALERT_OVERALL2_SPECTRUM | (0x06) VC_PEAKVUE_2 | Sensor 2 PeakVue Alert (Overall 2) Spectrum |
| (0x0B) BDCMD_READ_ALERT_OVERALL2_WAVEFORM | (0x02) VC_OVERALL_1 | Sensor 1 Acceleration Alert (Overall 2) Waveform |
| (0x0B) BDCMD_READ_ALERT_OVERALL2_WAVEFORM | (0x03) VC_PEAKVUE_1 | Sensor 1 PeakVue Alert (Overall 2) Waveform |
| (0x0B) BDCMD_READ_ALERT_OVERALL2_WAVEFORM | (0x05) VC_OVERALL_2 | Sensor 2 Acceleration Alert (Overall 2) Waveform |
| (0x0B) BDCMD_READ_ALERT_OVERALL2_WAVEFORM | (0x06) VC_PEAKVUE_2 | Sensor 2 PeakVue Alert (Overall 2) Waveform |
| (0x0C) BDCMD_READ_ALERT_PEAKVUE2_SPECTRUM | (0x02) VC_OVERALL_1 | Sensor 1 Velocity Alert (PeakVue 2) Spectrum |
| (0x0C) BDCMD_READ_ALERT_PEAKVUE2_SPECTRUM | (0x03) VC_PEAKVUE_1 | Sensor 1 PeakVue Alert (PeakVue 2) Spectrum |
| (0x0C) BDCMD_READ_ALERT_PEAKVUE2_SPECTRUM | (0x05) VC_OVERALL_2 | Sensor 2 Velocity Alert (PeakVue 2) Spectrum |
| (0x0C) BDCMD_READ_ALERT_PEAKVUE2_SPECTRUM | (0x06) VC_PEAKVUE_2 | Sensor 2 PeakVue Alert (PeakVue 2) Spectrum |
| (0x0D) BDCMD_READ_ALERT_PEAKVUE2_WAVEFORM | (0x02) VC_OVERALL_1 | Sensor 1 Acceleration[1] Alert (PeakVue 2) Waveform |
| (0x0D) BDCMD_READ_ALERT_PEAKVUE2_WAVEFORM | (0x03) VC_PEAKVUE_1 | Sensor 1 PeakVue Alert (PeakVue 2) Waveform |
| (0x0D) BDCMD_READ_ALERT_PEAKVUE2_WAVEFORM | (0x05) VC_OVERALL_2 | Sensor 2 Acceleration[1] Alert (PeakVue 2) Waveform |
| (0x0D) BDCMD_READ_ALERT_PEAKVUE2_WAVEFORM | (0x06) VC_PEAKVUE_2 | Sensor 2 PeakVue Alert (PeakVue 2) Waveform |

Because the host software 34 has access to the same data used to make the "store on alert" determinations by the firmware 20 in the device 12, the host software 34 can make the same determinations on data collection, provided the determinations are made synchronously with the publish rate of the device 12. Using block command codes related to the prior technique of scheduled analytical vibration data collections (cached in the device until the next scheduled collection), the host software 34 can retrieve similar analytical vibration data to that which would be cached inside the device via the "store on alert" techniques described herein. Care must be taken to ensure that this process remains synchronous to the data publish rate, and that analytical vibration data collections are started before the next scheduled publish from the device 12.

Scalar Vibration Data

As discussed previously, preferred embodiments of the invention evaluate Overall Vibration scalar data and Peak-Vue™ scalar data to determine whether to store analytical vibration data for further analysis. In other embodiments, other types of scalar values are evaluated for this purpose, including those discussed below.

Single-Input Scalar Values:

Overall Vibration calculated over a frequency range (low-pass, band-pass or high-pass)—By proper selection of filters, vibration caused by other sources can be eliminated to focus on the vibration from a specific source. This is the principle applied with Analysis Parameters and Variable frequency bands in Emerson's AMS Machinery Manager software and the CSI 2140 analyzer.

Demod—A scalar from demod, also referred to as enveloping, is a common technique used as an alternative to PeakVue™.

Spike Energy—This is well-known technology that looks at "spikes" in the vibration signal in a specific frequency range to focus in on impacts rather than on sinusoidal vibration.

Shock Pulse—This is another well-known technique that uses a special sensor with a specific resonance in a narrow frequency band to detect the presence of bearing problems.

Cepstrum—The Cepstrum is a spectrum of a spectrum, where a spectrum plot is run through a second FFT. Harmonic families, if present, appear as "periodic" information. Since bearing defects normally generate harmonics, the Cepstrum plot filters out random or non-periodic vibration sources to show only the turning speed and bearing defects.

Waveform Parameters:

Periodicity—Periodicity helps distinguish between forced impacting, such as from bearings or gears, and random impacting, such as from lubrication/cavitation.

Crest Factor—The crest factor compares the peak value to the average value. Typically, the ratio is about 2. A crest factor higher than 3 indicates excursions (i.e. impacts). A crest factor higher than 10 indicates significant excursions.

Skewness—Skewness indicates how much of the vibration signal is positive versus negative. In normal operation, these are about equal. The presence of a skewed signal indicates some artificial limitation on movement of a machine component, such as a shaft rubbing against a bearing housing, or binding, or a pre-loading force.

Kurtosis—Kurtosis is a probability distribution that indicates how much of the data concentrated around the mean value. A high kurtosis value indicates that the data is concentrated around the mean, whereas a low kurtosis value that the data is distributed away from the mean.

Multiple Inputs:

Phase—Phase data provides an indication that an impact is occurring at a specific location relative to the rotational position of a shaft. Comparison of two vibration signals, or comparison of a vibration signal to a tachometer signal, provides information about the directional component of the vibration at the turning speed, which correlates to imbalance. Evaluation of the TREND of phase data at multiples of the running speed indicates non-linearity in a machine, such as due to cracks and structural defects.

Frequency Transfer Functions—The frequency transfer function indicates the resonance response of a structure to an input or impact. A scalar of a frequency transfer function would be a scalar value at a specific frequency, which would indicate the likelihood that the structure has a resonance at the specific frequency.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for collecting and storing analytical vibration data in memory of a machine vibration monitoring device, the method comprising:

(a) storing one or more alert threshold levels in the memory of the machine vibration monitoring device, each alert threshold level comprising a scalar value indicating a threshold between two predefined machine operational condition ranges;

(b) sensing vibration of a machine and generating analog machine vibration signals based thereon using one or more vibration sensors, and converting the analog machine vibration signals to digital machine vibration data;

(c) based on the digital machine vibration data, calculating a scalar vibration value using a processor in the machine vibration monitoring device;

(d) at predetermined time intervals, comparing the scalar vibration value to one or more of the alert threshold levels using the processor in the machine vibration monitoring device;

(e) based on the digital machine vibration data, the processor in the machine vibration monitoring device generating analytical vibration data that comprise one or both of vibration waveforms and vibration spectra, and storing the analytical vibration data in the memory of the machine vibration monitoring device;

(f) only when it is determined in step (d) that the scalar vibration value exceeds one or more of the alert threshold levels that the scalar vibration value did not exceed at a prior predetermined time interval, storing the analytical vibration data in a separate buffer in the memory of the machine vibration monitoring device, wherein the analytical vibration data stored in the separate buffer provide relevant diagnostic information about a specific machine performance event that is indicated by the scalar vibration value exceeding one or more of the alert threshold levels; and (g) transmitting the analytical vibration data stored in the separate buffer of the memory of the machine vibration monitoring device via the wireless data network to be acquired by a host computer, the transmitting performed by a wireless transceiver in the machine vibration monitoring device.

2. The method of claim 1 further comprising:
(h) the processor of the machine vibration monitoring device setting a status bit indicating that the analytical vibration data are available for acquisition; and
(i) the host computer determining that the analytical vibration data are available for acquisition based on presence of the status bit.

3. The method of claim 1 further comprising:
(h) storing a minimum hysteresis counter value in the memory of the machine vibration monitoring device;
(i) updating an ongoing hysteresis counter value at predetermined time intervals;
(j) comparing the ongoing hysteresis counter value to the minimum hysteresis counter value at predetermined time intervals; and
step (f) further comprising storing the analytical vibration data in the separate buffer of the memory of the machine monitoring device if it is determined that
the ongoing hysteresis counter value is greater than or equal to the minimum hysteresis counter value, and
the scalar vibration value exceeds one or more of the alert threshold levels that the scalar vibration value did not exceed at a prior predetermined time interval.

4. The method of claim 3 further comprising:
(k) storing a baseline level scaling value (BLSV) in the memory of the machine vibration monitoring device;
(l) at predetermined time intervals, updating a low baseline level (LBL) according to:

$$LBL = AT - BLSV \times (AT - NLAT),$$

where AT is one of the alert threshold levels that is less than and nearest to the scalar vibration value, and NLAT is one of the alert threshold levels that is less than and nearest to AT; and
(m) at predetermined time intervals, updating a high baseline level (HBL) according to:

$$HBL = NHAT,$$

where NHAT is one of the alert threshold levels that is greater than and nearest to AT.

5. The method of claim 4 wherein the step (i) of updating the ongoing hysteresis counter value (OHC) comprises comparing the scalar vibration value to LBL and HBL, and
if the scalar vibration value is greater than HBL, incrementing OHC according to:

$$OHC = OHC + 1;$$

if the scalar vibration value is less than LBL, decrementing OHC according to:

$$OHC = OHC - 1;$$

if the scalar vibration value is greater than or equal to LBL and less than or equal to HBL, and OHC is greater than zero, decrementing OHC according to:

$$OHC = OHC - 1; \text{ and}$$

if the scalar vibration value is greater than or equal to LBL and less than or equal to HBL, and OHC is less than zero, incrementing OHC according to:

$$OHC = OHC + 1.$$

6. The method of claim 1 wherein the scalar vibration value comprises one or more of an Overall vibration value, a PeakVue vibration value, an Energy Band value, a Demod value, a Spike Energy value, a Shock Pulse value, a Cepstrum value, a Periodicity value, a Skewness value, a Probability Distribution value, a Frequency Transfer Function value, a Phase value, a Kurtosis value, and a Crest Factor value.

7. The method of claim 1 wherein subsequent acquisition of the analytical vibration data by the host computer is accomplished via a wireless gateway device through which the host computer wirelessly acquires the analytical vibration data that are published by the machine vibration monitoring device.

8. The method of claim 1 further comprising maintaining the analytical vibration data in the separate buffer of the memory of the machine vibration monitoring device until:
the host computer has acquired the analytical vibration data; or
the analytical vibration data are overwritten in the separate buffer of the memory of the machine vibration monitoring device by later-collected analytical vibration data.

9. A method for collecting and storing analytical vibration data in memory of a machine vibration monitoring device, the method comprising:
(a) storing one or more alert threshold levels in memory of a host computer that is in communication with the machine vibration monitoring device, each alert threshold level comprising a scalar value indicating a threshold between two predefined machine operational condition ranges;
(b) sensing vibration of a machine and generating analog machine vibration signals based thereon using one or more vibration sensors, and converting the analog machine vibration signals to digital machine vibration data using a processor in the machine vibration monitoring device;
(c) generating analytical vibration data based on the digital vibration data using the processor in the machine vibration monitoring device, wherein the analytical vibration data comprise one or both of vibration waveforms and vibration spectra, the analytical vibration data containing information about a specific machine performance event;
(d) storing the analytical vibration data in the memory of the machine monitoring device;
(e) based on the digital machine vibration data, calculating a scalar vibration value using the processor in the machine vibration monitoring device and storing the scalar vibration value in the memory of the machine monitoring device for subsequent acquisition by the host computer;
(f) the host computer acquiring the scalar vibration value from the memory of the machine vibration monitoring device and comparing the scalar vibration value to one or more of the alert threshold levels using a processor in the host computer; and
(g) only when it is determined in step (f) that the scalar vibration value exceeds one or more of the alert threshold levels that the scalar vibration value did not exceed previously, thereby indicating an occurrence of the specific machine performance event, the host computer acquiring the analytical vibration data from the memory of the machine vibration monitoring device and storing the analytical vibration data in the host computer or in a database that is in communication with the host computer.

10. An apparatus for collecting and storing analytical vibration data, the apparatus comprising:
a wireless data network;
a machine vibration monitoring device comprising:
memory for storing one or more alert threshold levels, each alert threshold level comprising a scalar value indicating a threshold between two predefined machine operational condition ranges;

one or more vibration sensors for sensing vibration levels of a machine and generating analog machine vibration signals based thereon;

an analog-to-digital converter for generating digital machine vibration data based on the analog machine vibration signals;

a processor for calculating a scalar vibration value based on the measured vibration levels, for comparing the scalar vibration value to one or more of the alert threshold levels at predetermined time intervals, and for storing analytical vibration data in the memory of the machine vibration monitoring device only if the scalar vibration value exceeds one or more of the alert threshold levels that the scalar vibration value did not exceed at a previous predetermined time interval, thereby indicating an occurrence of a specific machine performance event, wherein the analytical vibration data comprise one or both of vibration waveforms and vibration spectra generated from the digital machine vibration data, the analytical vibration data containing information about the specific machine performance event; and a transceiver for transmitting the analytical vibration data stored in the memory via the wireless data network to be acquired by one or more host computers; and the one or more host computers for acquiring the analytical vibration data that was stored in the memory of the machine vibration monitoring device.

11. The apparatus of claim 10 further comprising a wireless gateway device through which the one or more host computers wirelessly acquire the analytical vibration data that are transmitted by the machine vibration monitoring device.

12. The apparatus of claim 10 wherein
the processor of the machine vibration monitoring device is operable to set a status bit indicating that the analytical vibration data are available for acquisition; and
the one or more host computers are operable to determine that the analytical vibration data are available for acquisition based on presence of the status bit.

13. The apparatus of claim 10 further comprising:
the memory of the machine vibration monitoring device for storing a minimum hysteresis counter value;
the processor of the machine vibration monitoring device operable to update an ongoing hysteresis counter value and compare the ongoing hysteresis counter value to the minimum hysteresis counter value at predetermined time intervals; and
the processor of the machine vibration monitoring device further operable to store the analytical vibration data in the memory of the machine monitoring device if it is determined that
the ongoing hysteresis counter value is greater than or equal to the minimum hysteresis counter value, and
the scalar vibration value exceeds one or more of the alert threshold levels that the scalar vibration value did not exceed previously.

14. The apparatus of claim 13 further comprising:
the memory of the machine vibration monitoring device for storing a baseline level scaling value (BLSV);
the processor of the machine vibration monitoring device further operable to update a low baseline level (LBL) at predetermined time intervals according to:

$$LBL = AT - BLSV \times (AT - NLAT),$$

where AT is one of the alert threshold levels that is less than and nearest to the scalar vibration value, and NLAT is one of the alert threshold levels that is less than and nearest to AT; and
the processor of the machine vibration monitoring device further operable to update a high baseline level (HBL) at predetermined time intervals according to:

$$HBL = NHAT,$$

where NHAT is one of the alert threshold levels that is greater than and nearest to AT.

15. The apparatus of claim 14 wherein the processor of the machine vibration monitoring device is operable to update the ongoing hysteresis counter value (OHC) by comparing the scalar vibration value to LBL and HBL, and
if the scalar vibration value is greater than HBL, the processor is operable to increment OHC according to:

$$OHC = OHC + 1;$$

if the scalar vibration value is less than LBL, the processor is operable to decrement OHC according to:

$$OHC = OHC - 1;$$

if the scalar vibration value is greater than or equal to LBL and less than or equal to HBL, and OHC is greater than zero, the processor is operable to decrement OHC according to:

$$OHC = OHC - 1; \text{ and}$$

if the scalar vibration value is greater than or equal to LBL and less than or equal to HBL, and OHC is less than zero, the processor is operable to increment OHC according to:

$$OHC = OHC + 1.$$

16. The apparatus of claim 10 wherein the scalar vibration value comprises one or more of an Overall vibration value, a PeakVue vibration value, an Energy Band value, a Demod value, a Spike Energy value, a Shock Pulse value, a Cepstrum value, a Periodicity value, a Skewness value, a Probability Distribution value, a Frequency Transfer Function value, a Phase value, a Kurtosis value, and a Crest Factor value.

17. The apparatus of claim 10 wherein the memory of the machine vibration monitoring device is operable to maintain the analytical vibration data in until:
the one or more host computers retrieve the analytical vibration data; or
the analytical vibration data are overwritten by later-collected analytical vibration data.

* * * * *